United States Patent
Purohit (10) Patent No.: US 9,300,583 B2
(45) Date of Patent: Mar. 29, 2016

(54) MAINTAINING ROUTING INFORMATION IN MEMORY CONSTRAINED ROUTERS

(71) Applicant: GainSpan Corporation, San Jose, CA (US)

(72) Inventor: Sibasis Purohit, Bangalore (IN)

(73) Assignee: GAINSPAN CORPORATION, San Jose, CA (US)

( * ) Notice: Subject to any disclaimer, the term of this patent is extended or adjusted under 35 U.S.C. 154(b) by 225 days.

(21) Appl. No.: 14/161,716

(22) Filed: Jan. 23, 2014

(65) Prior Publication Data

US 2015/0207737 A1    Jul. 23, 2015

(51) Int. Cl.
*H04L 12/28* (2006.01)
*H04L 12/743* (2013.01)
*H04L 12/56* (2006.01)

(52) U.S. Cl.
CPC .......... *H04L 45/7453* (2013.01); *H04L 45/741* (2013.01)

(58) Field of Classification Search
USPC ......... 370/389, 392, 393, 395.3, 395.31, 471, 370/474, 475
See application file for complete search history.

(56) References Cited

U.S. PATENT DOCUMENTS

| | | | |
|---|---|---|---|
| 6,553,002 B1 | 4/2003 | Bremer | |
| 6,934,252 B2 | 8/2005 | Mehrotra | |
| 7,711,852 B1 * | 5/2010 | Troan .................. | H04L 41/0843 709/223 |
| 8,301,738 B1 * | 10/2012 | Alex .................... | H04L 61/2038 709/220 |
| 2005/0041675 A1 * | 2/2005 | Trostle .............. | H04L 29/12009 370/401 |
| 2012/0224504 A1 * | 9/2012 | Ramasamy ............. | H04L 45/34 370/254 |
| 2012/0320768 A1 | 12/2012 | Shaffer | |
| 2012/0324273 A1 | 12/2012 | Shaffer | |
| 2013/0121335 A1 | 5/2013 | Hui | |
| 2013/0223237 A1 | 8/2013 | Hui | |

(Continued)

FOREIGN PATENT DOCUMENTS

| | | |
|---|---|---|
| CN | 103107945 A | 5/2013 |
| WO | 2003063427 A1 | 7/2003 |

OTHER PUBLICATIONS

George Oikonomou, Iain Phillips and Theo Tryfonas, "IPv6 Multicast Forwarding in RPL-Based Wireless Sensor Networks", http://link.springer.com/article/10.1007/s11277-013-1250-5 , vol. 73, Issue 3, dated : Jun. 12, 2013, p. 1.

(Continued)

*Primary Examiner* — Kwang B Yao
*Assistant Examiner* — Nguyen Ngo
(74) *Attorney, Agent, or Firm* — Iphorizons PLLC; Narendra Reddy Thappeta (57) ABSTRACT

A router in an embodiment associates a corresponding digital code of a set of digital codes to a respective portion of a network address of set of network addresses used in routing information. The routing information is stored in a memory with each digital code substituted for the respective portion of the network address. Memory reduction is obtained as a result. In an embodiment implemented in the context of IPv6 having a prefix and a host identifier for each network address, the portion of a network address corresponds to the prefix. The routing information is stored in the form of a prefix table and topology information. The prefix table stores a mapping of each digital code to a corresponding prefix. The topology information indicates a manner in which each host system and router are connected to each other. Packets are forwarded by examining such routing information.

11 Claims, 12 Drawing Sheets

(56) References Cited

U.S. PATENT DOCUMENTS

2013/0227114 A1    8/2013  Vasseur
2014/0122791 A1*   5/2014  Fingerhut ............... H04L 49/00
                                                      711/108

OTHER PUBLICATIONS

Wenjuan Lian; Coll. of Network Eng., Shandong Univ. of Sci. & Technol., Qingdao, China; Yongquan Liang; Qingtian Zeng; Hongmei Zhu, "An Agent-Based Framework for Personalized Web Service Recommendation", Computer Science and Engineering, 2009. WCSE '09. Second International Workshop on (vol. 2 ), Dated: Oct. 28-30, 2009, p. 1.

Jeong-Joon Kim, Jeong-Jin Kang, Ki-Young Lee, Gyoo-Seok Choi, Yong-Soon Im and Eun-Young Kang, "Efficient Processing of KNN Queries in Wireless Sensor Networks", International Journal of Software Engineering and Its Applications, vol. 7, No. 2, dated: Mar. 2013, pp. 137-147.

* cited by examiner

FIG. 1

| | Node Name | Prefix | Host Id | IPv6 Address |
|---|---|---|---|---|
| 311→ | BR | 11:11:11:11 | b:b:b:b | 11:11:11:11::b:b:b:b |
| 312→ | R1 | 11:11:11:11 | 2:2:2:2 | 11:11:11:11::2:2:2:2 |
| 313→ | R2 | 11:11:11:11 | 3:3:3:3 | 11:11:11:11::3:3:3:3 |
| 314→ | H1 | 11:11:11:11 | 1:1:1:1 | 11:11:11:11::1:1:1:1 |
| 315→ | H2 | 11:11:11:11 | 4:4:4:4 | 11:11:11:11::4:4:4:4 |
| 316→ | R3 | 11:11:11:11 | 5:5:5:5 | 11:11:11:11::5:5:5:5 |
| 317→ | R4 | 11:11:11:11 | 6:6:6:6 | 11:11:11:11::6:6:6:6 |
| 318→ | R5 | 11:11:11:11 | 7:7:7:7 | 11:11:11:11::7:7:7:7 |
| 319→ | H4 | 11:11:11:11 | 8:8:8:8 | 11:11:11:11::8:8:8:8 |
| 320→ | R6 | 11:11:11:11 | 9:9:9:9 | 11:11:11:11::9:9:9:9 |
| 321→ | H3 | 11:11:11:11 | a:a:a:a | 11:11:11:11::a:a:a:a |

| Array Index | MAC Address | Prefix Index | Host Id |
|---|---|---|---|
| 0 | R1 MAC Address | 0 | 2:2:2:2 |
| 1 | R2 MAC Address | 0 | 3:3:3:3 |
| 2 | H1 MAC Address | 0 | 1:1:1:1 |
| 3 | H2 MAC Address | 0 | 4:4:4:4 |

FIG. 6

| Array Index | Prefix Index | Host ID | Parent Index |
|---|---|---|---|
| 0 (For R3) | 0 | 5:5:5:5 | 1:0 |
| 1 (For R4) | 0 | 6:6:6:6 | 1:0 |
| 2 (For R5) | 0 | 7:7:7:7 | 0:0 |
| 3 (For R6) | 0 | 9:9:9:9 | 0:1 |
| 4 (For H4) | 0 | 8:8:8:8 | 0:0 |
| 5 (For H3) | 0 | a:a:a:a | 0:1 |

| | Node Name | Prefix | Host Id | IPv6 Address |
|---|---|---|---|---|
| 711→ | BR | 11:11:11:11 | b:b:b:b | 11:11:11:11:b:b:b:b |
| 712→ | R1 | 22:22:22:22 | 2:2:2:2 | 22:22:22:22:2:2:2:2<br>11:11:11:11:2:2:2:2 |
| 713→ | R2 | 33:33:33:33 | 3:3:3:3 | 33:33:33:33:3:3:3:3<br>11:11:11:11:3:3:3:3 |
| 714→ | H1 | 11:11:11:11 | 1:1:1:1 | 11:11:11:11:1:1:1:1 |
| 715→ | H2 | 11:11:11:11 | 4:4:4:4 | 11:11:11:11:4:4:4:4 |
| 716→ | R3 | 44:44:44:44 | 5:5:5:5 | 44:44:44:44:5:5:5:5<br>22:22:22:22:5:5:5:5 |
| 717→ | R4 | 55:55:55:55 | 6:6:6:6 | 55:55:55:55:6:6:6:6<br>22:22:22:22:6:6:6:6 |
| 718→ | R5 | 66:66:66:66 | 7:7:7:7 | 66:66:66:66:7:7:7:7<br>44:44:44:44:7:7:7:7 |
| 719→ | H4 | 44:44:44:44 | 8:8:8:8 | 44:44:44:44:8:8:8:8 |
| 720→ | R6 | 77:77:77:77 | 9:9:9:9 | 77:77:77:77:9:9:9:9<br>55:55:55:55:9:9:9:9 |
| 721→ | H3 | 55:55:55:55 | a:a:a:a | 55:55:55:55:a:a:a:a |

| Array Index | Prefix |
|---|---|
| 0 | 11:11:11:11 |
| 1 | 22:22:22:22 |
| 2 | 33:33:33:33 |
| 3 | 44:44:44:44 |
| 4 | 55:55:55:55 |
| 5 | 66:66:66:66 |
| 6 | 77:77:77:77 |

*FIG. 8*

| Array Index | MAC Address | Prefix Index | Host Id |
|---|---|---|---|
| 0 | R1 MAC Address | 0 | 2:2:2:2 |
| 1 | R2 MAC Address | 0 | 3:3:3:3 |
| 2 | H1 MAC Address | 0 | 1:1:1:1 |
| 3 | H2 MAC Address | 0 | 4:4:4:4 |

| Array Index | Prefix Index | Host ID | Parent Index |
|---|---|---|---|
| 0 (For R1) | 1 | | |
| 1 (For R2) | 2 | 2:2:2:2 | 1:0 |
| 2 (For R3) | 1 | 3:3:3:3 | 1:1 |
| 3 (For R3) | 3 | 5:5:5:5 | 0:0 |
| 4 (For R4) | 1 | 5:5:5:5 | 0:2 |
| 5 (For R4) | 4 | 6:6:6:6 | 0:0 |
| 6 (For R5) | 3 | 6:6:6:6 | 0:4 |
| 7 (For R5) | 5 | 7:7:7:7 | 0:3 |
| 8 (For R6) | 4 | 7:7:7:7 | 0:6 |
| 9 (For R6) | 6 | 9:9:9:9 | 0:5 |
| 10 (For H3) | 4 | 9:9:9:9 | 0:8 |
| 11 (For H4) | 3 | a:a:a:a | 0:5 |
| | | 8:8:8:8 | 0:3 |

FIG. 11

MAINTAINING ROUTING INFORMATION IN MEMORY CONSTRAINED ROUTERS

BACKGROUND OF THE INVENTION

1. Technical Field

Embodiments of the present disclosure relate generally to routers, and more specifically to maintaining routing information in memory constrained routers.

2. Related Art

A router refers to a switch, which operates at network layer. Thus, a router may receive an IP (Internet Protocol) packet on one interface and forward the packet on another interface determined typically by the header of the packet. Such switching of a packet from one interface to another interface is termed as routing when the switching decision is based on addresses at network layer (e.g., IP).

Routers maintain routing information, which often forms the basis for the switching function. The routing information indicates the specific interface on which to forward a packet, typically based on the destination IP address (though other considerations such as desired QoS, can also be considered in determining the path on which the packet is forwarded).

At least for a superior throughput performance, routing information is often stored in high performance memories (e.g., random access memory (RAM)), while routing packets. By storing in a RAM, packets can normally be switched/routed quickly. However, there are situations when a router may have limited memory available for storing routing information.

Aspects of the present disclosure enable packets to be routed, with reduced memory requirements, as described below with examples.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A router provided according to an aspect of the present disclosure associates a corresponding digital code of a set of digital codes to a respective portion of a network address of set of network addresses used in routing information. The routing information is stored in a memory with each digital code substituted for the respective portion of the network address. Reduction in requirement of memory space, is obtained as a result.

In an embodiment implemented in the context of IPv6 having a prefix and a host identifier for each network address, the portion of a network address corresponds to the prefix. The routing information is stored in the form of a prefix table and topology information. The prefix table stores a mapping of each digital code to a corresponding prefix. The topology information indicates a manner in which each host system and router are connected to each other.

Packets are forwarded by examining such routing information.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
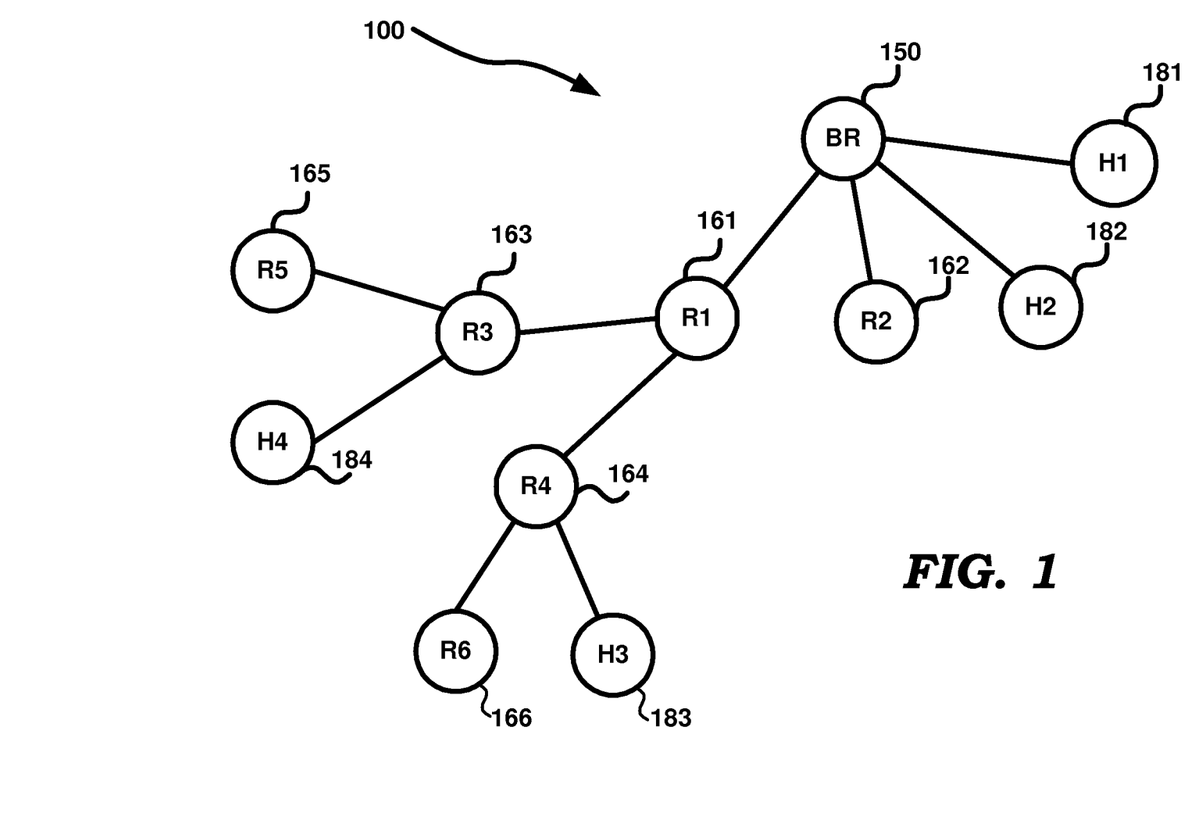
FIG. 1 is a block diagram of an example networked system in an embodiment.

FIG. 1 is an example environment in which several aspects of the present disclosure are implemented. FIG. 1 shows networked system 100 containing a network of routers including Border Router (BR 150), R1 161, R2 162, R3 163, R4 164, R5 165, and R6 166. The network is shown connecting host systems H1 181, H2 182, H3 183 and H4 184.

The example of FIG. 1 is shown containing only representative systems for illustration. However, real-world environments may contain many more systems as will be apparent to one skilled in the relevant arts. In addition, for illustration, the network is assumed to be operating based on IPv6 protocol, though alternative embodiments can be implemented based on other networking protocols, as will be apparent to a skilled practitioner by reading the disclosure provided herein.

Each host system H1-H4 (181-184) can be any device, which is a producer (created) or consumer (no further forwarding and processed internally) of packets transmitted on the network. Each host is deemed to be assigned a unique network (e.g., IP) address. Typically, the header of each packet contains a source address (representing the network address of the host from which the packet originates) and a destination address (representing the network address of the host to which the packet is eventually destined). The information in the header is used by each router BR 150, and R1-R6 (161-166) to forward the packet towards the eventual destination system. Border Router (BR) 150 is a router on the boundary of networked system 100, and communications with external networks may be routed via BR 150.

Each of routers BR 150 and R1-R6 (161-166) may receive a packet on one interface (from a source host system) and forward the packet on another interface determined by the destination address of the packet. Such forwarding is continued until the packet is delivered to the eventual destination host.

Each interface may be viewed as being synonymous with (or as being a part of) a corresponding path (line) connecting a router to another router/host system. However, often multiple host systems/routers may share a same network (e.g., local area network), in which case a single interface would be present to all systems on the network.

The routing information specifies the specific interface to be selected in forwarding of each packet, and a router may store the routing information in a memory. Aspects of the present disclosure enable the routing information to be stored with reduced memory size requirements, as described below with examples.

3. Routing with Reduced Memory Requirement

Figure 2:
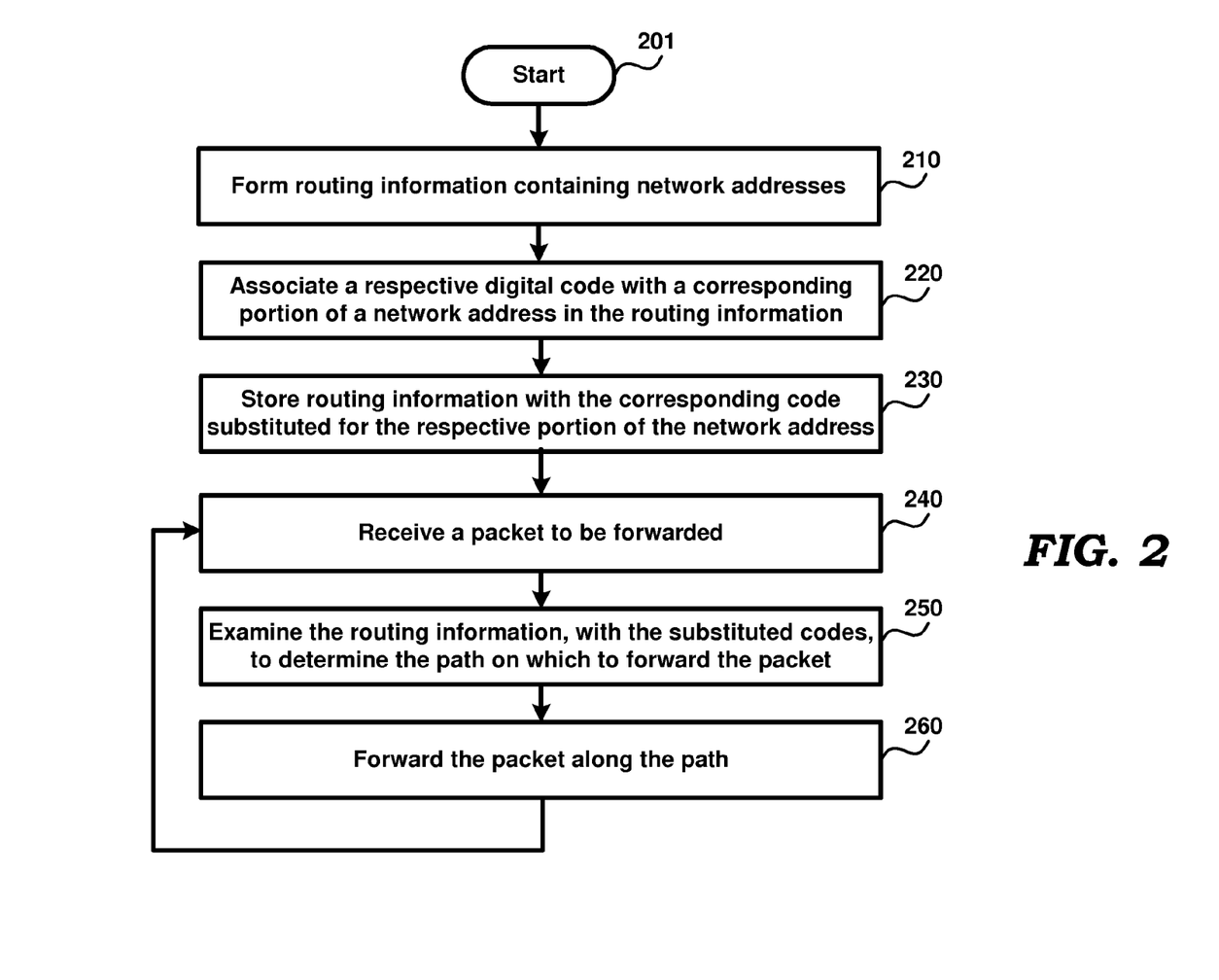
FIG. 2 is a flowchart illustrating the manner in which routing is performed with reduced memory space requirements, in an embodiment.

FIG. 2 is a flowchart illustrating the manner in which a router performs routing function with reduced memory requirements, in an embodiment. The flowchart is described with respect to the environment of FIG. 1 and in particular with respect to border router (BR) 150 merely for illustration. However, various features described herein can be implemented in other environments and in other routers as well, as will be apparent to one skilled in the relevant arts by reading the disclosure provided herein.

Further, the steps in the flowchart are described in a specific sequence merely for illustration. Alternative embodiments using a different sequence of steps can also be implemented without departing from the scope and spirit of several aspects of the present disclosure, as will be apparent to one skilled in the relevant arts by reading the disclosure provided herein. The flowchart starts in step 201, in which control passes immediately to step 210.

In step 210, BR 150 forms routing information. As may be readily appreciated, the routing information contains network addresses in accordance with the networking protocol employed in networked system 100. The routing information may be formed based on any suitable protocols and/or user configurations as suited for the corresponding environment, in a known way.

In step 220, BR 150 associates a respective digital code with a corresponding portion of a network address (contained in the routing information). The digital codes can be any digital values, but need to be shorter in length (number of bits) compared to the represented portions, to obtain the desired reduction of memory space requirement.

In the illustrative example of IPv6 environment in which a network address is deemed to contain a 'prefix' (network identifier) and a host identifier, a corresponding digital code is assigned to each prefix. In addition, the digital code is conveniently used as an index to an array storing the portion-code mapping. However, alternative conventions, as suited for the corresponding environments, can be employed, without departing from the scope and spirit of several aspects of the present invention.

In step 230, BR 150 stores routing information with the corresponding code substituted for the respective portion of the network address. In view of such substitution, the routing information may be represented by fewer bits, thereby leading to reduced memory requirement. The routing information may be updated to reflect changes of, for example, network topology, though the description is continued assuming the same routing information as being used in forwarding of packets.

In step 240, BR 150 receives a packet to be forwarded on one of the interfaces.

In step 250, BR 150 examines the routing information to determine the path on which to forward the packet. The path can be a mere interface to a next hop node (router or host) or can define a sequence of hops (e.g., in the form of intermediate routers) that lead to the destination host. As the routing information is represented with the code substitution noted in step 220, additional processing is required (compared to a hypothetical case in which there is no such substitution) for examining the routing information.

In step 260, BR 150 forwards the packet along the path, or specifically the interface deemed to be part of such a path. Control then passes to step 240 to process the next packet. As noted above, the routing information may be updated in parallel, as the packets are processed for forwarding.

The description is continued with respect to the details of some additional examples illustrating at least some of the features described above with respect to FIG. 2.

4. Source Routing

In an embodiment, networked system 100 is implemented in accordance with ZigBee-IP Standard of protocols, which implements source routing. As is well known, ZigBee-IP Standard is particularly relevant in low power wireless environments. For further details of ZigBee-IP, the reader is referred to the corresponding IEEE 802.15.4 specifications and RFCs related to RPL.

In source routing, a central router (root) is normally designed to indicate the specific intermediate routers, if any, that are in the path to a specific destination address. For example, assuming a packet is destined to host H4 184, BR 150 may indicate in the corresponding packet that routers 161 and 163 are the intermediate routers in the path to H4 184. The path information is embedded in the header of the packet being forwarded such that each router in the path can forward to the next router indicated in the path. The destination host is directly communicable (without any further intermediate hops) from the last router specified in the path.

A suitable routing protocol is normally operable to facilitate the central router to form such routing information. The routing protocol operates to provide each router with information of corresponding parent (in the path to the central router) such that each packet received from a source host can be forwarded to the central router, which thereafter uses source routing, as described above, to ensure that the packet is eventually delivered to the destination host specified in the packet (by the corresponding IPv6 address).

The routers may be operable in either a storing mode or a non-storing mode. In the storing mode, each router may have its view of the routing information such that the source routing decisions can be performed without having to rely on the operation of the root. For example, assuming a packet is being forwarded from H4 184 to H3 183, and that router R1 161 is operating in storing mode, the router R1 161 does not forward the packet to BR 150. Instead, R1 161 operates to indicate that the packet needs to be forwarded via R4 164 alone to reach host H3 183, since R1 161 has routing information corresponding to the downward portion of the tree.

On the other hand, in non-storing mode, the same packet would be received by BR 150 (via R1 161), which incorporates the source routing information as R1 161, R4 164 and H3 183. In other words, each packet to be forwarded by a router via other routers, may be routed via BR 150, which has the necessary routing necessary for all hosts of networked system 100.

In either case, it may be appreciated that BR 150 is required to maintain routing information indicating the paths to be used for reaching various hosts. As the number of nodes (routers and hosts) increases, the amount of information to be stored also correspondingly increases.

The description is continued with respect to the manner in which memory space requirements are reduced in BR 150 in such a scenario. The description is continued with respect to 'single prefix' case and then 'multiple prefix' case.

5. Single Prefix Case

In the illustrative example of IPv6 environment, network address of a node is deemed to contain a 'prefix' (network identifier) and a host identifier. The prefix of a network address uniquely identifies the corresponding network of an inter-networked environment and host identifier uniquely identifies the node (host or router) in the corresponding network. In single prefix environment, all the network interfaces contain same prefix.

FIGS. 3A, 3B and 4-6 together illustrate the operation with respect to single prefix environment in an embodiment. The tables there and the values therein are only for illustrative purpose and should not be taken in a limiting sense.

Figure 3A:
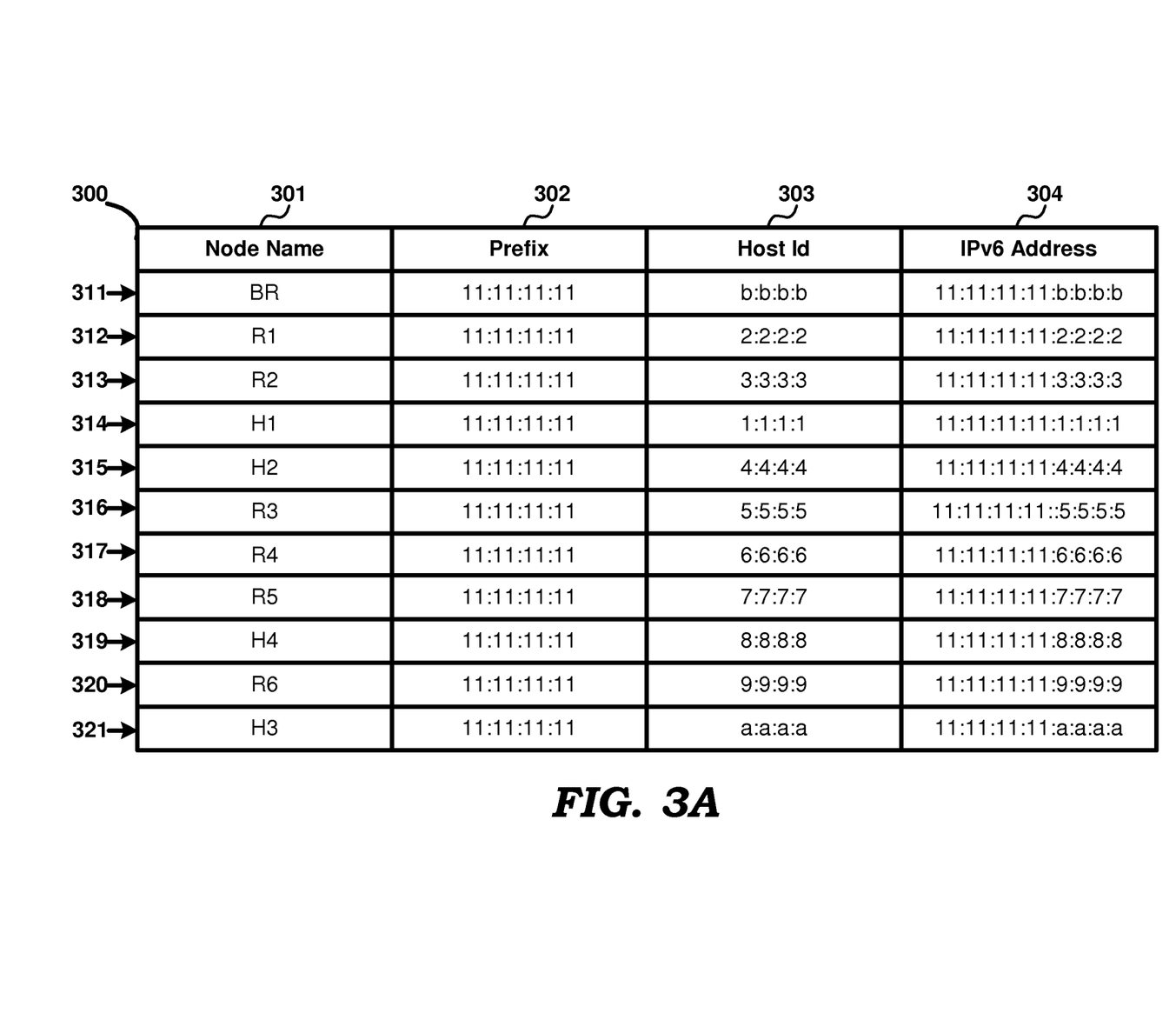
FIG. 3A depicts the respective address of nodes of a networked environment, with corresponding networked addresses of a single prefix, in an embodiment.
Figure 3B:
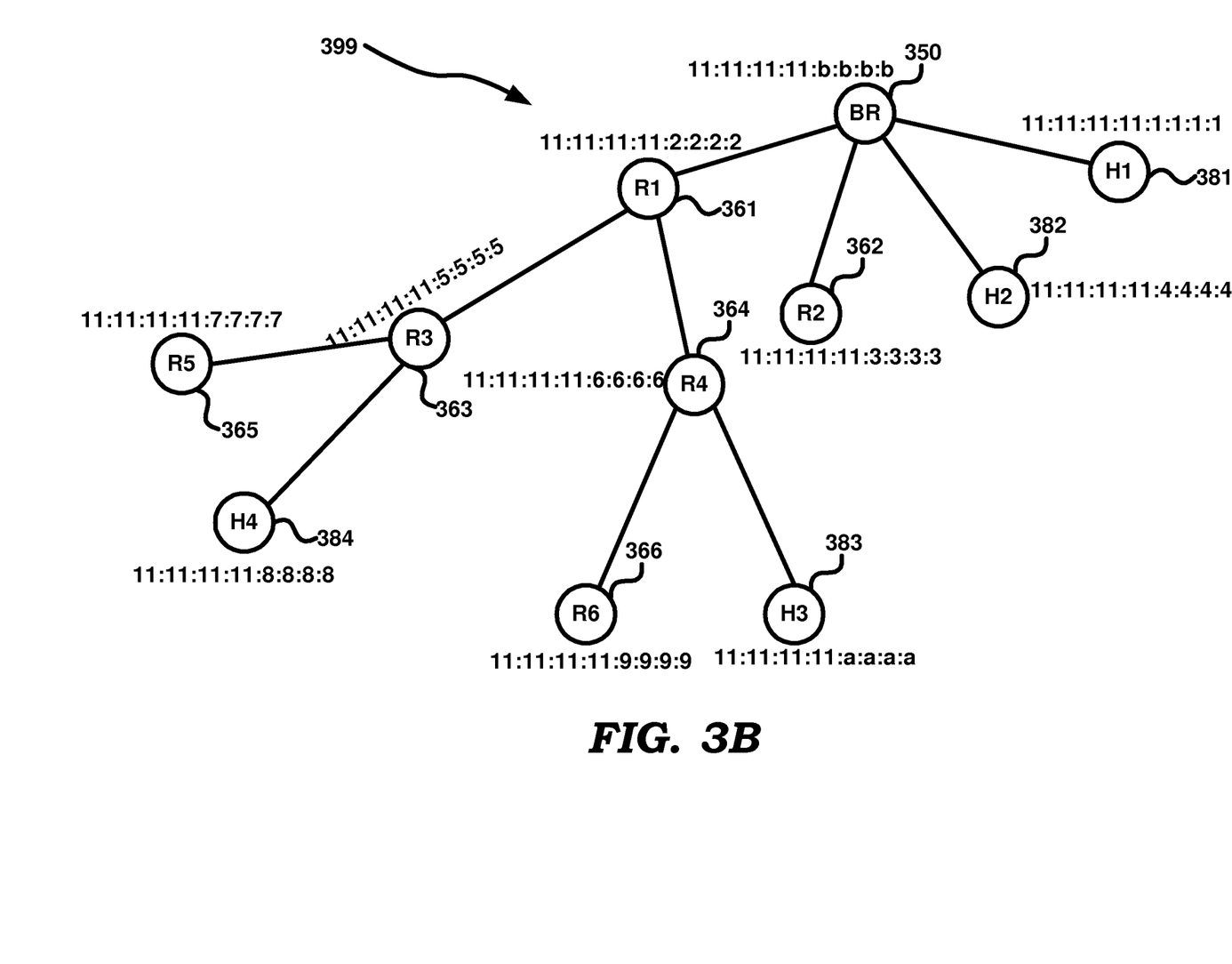
FIG. 3B depicts a topology representing the routing information pictorially, in an embodiment.

Table 300 of FIG. 3A depicts the IPv6 addresses of the various nodes, and FIG. 3B depicts logically the routing information formed by operation of applicable routing protocols. FIG. 3A is shown containing node name 301, prefix 302, host identifier 303, IPv6 address 304 for various nodes, with the information for each node being represented in a corresponding one of the rows 311-321. As may be readily observed, the IPv6 address 304 is formed by the concatenation of prefix and host identifier 303.

The topology of FIG. 3B is conveniently shown with the IPv6 addresses of the corresponding nodes. The topology may be represented by the combination of tables depicted in FIGS. 4-6, as described below.

Figure 4:
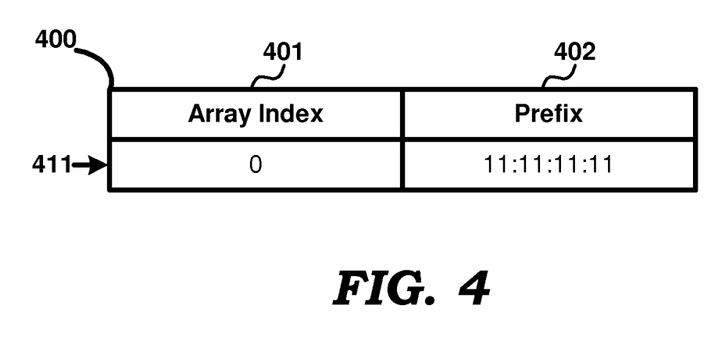
FIGS. 4-6 contain respective tables, together illustrating the manner in which routing information is represented in a memory in one embodiment.

FIG. 4 depicts index table 400 having array index 401 and prefix 402, as columns. The rows of the table store a row corresponding to each prefix present in networked system 399, and only a single entry/row 411 is shown since a single pre-fix addressing is used. Row 411 indicates that an array index of 0 is used for prefix 11:11:11:11.

Figure 5:
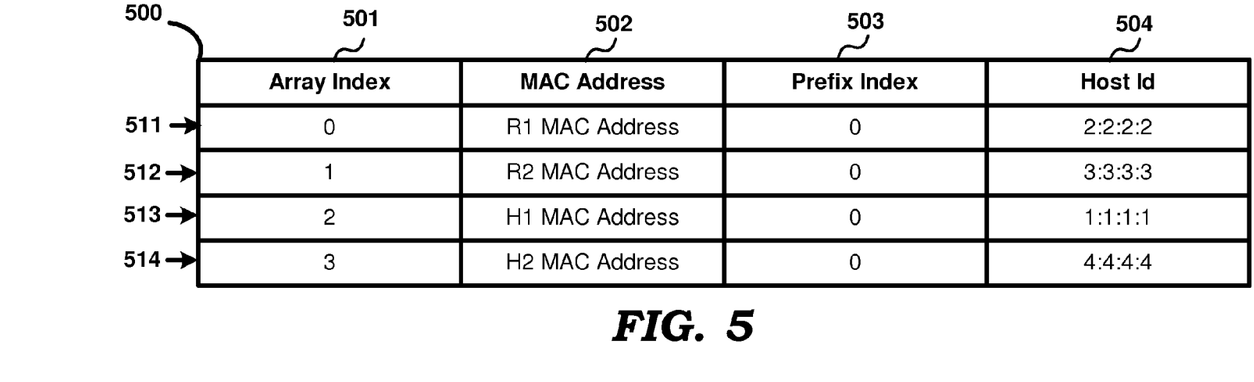

FIG. 5 depicts neighbor table 500 having columns array index 501, MAC address 502, prefix index 503 and host identifier 504. As may be appreciated, the neighbor table indicates each neighbor node (reachable in a single hop) to BR 350 in the corresponding one of rows 511-514. Consistent with FIG. 3B, information corresponding R1 361, R2 362, H1 381 and H2 382 is shown in respective rows 511-514.

Prefix index 503 is shown containing the value (1 byte or less) in array index 401/411 (instead of the 8 byte prefix), thereby leading to memory reduction. Array index 501 is used in combination with FIG. 6 to represent the topology of FIG. 3B, as described below.

Figure 6:
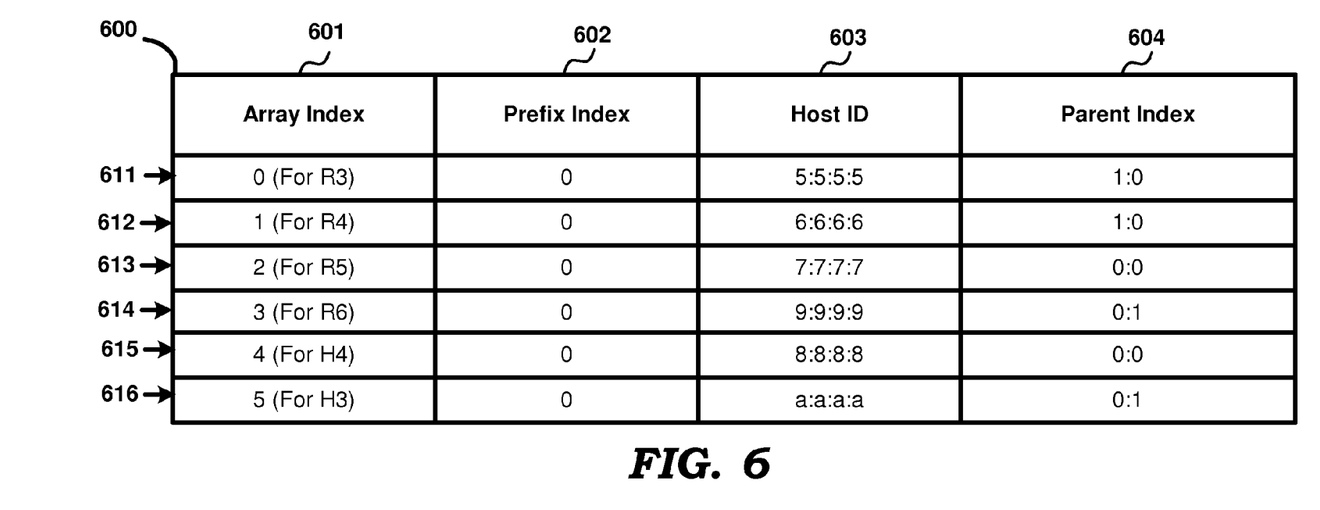

FIG. 6 distant topology table 600 having columns array index 601, prefix index 602, host identifier 603 and parent index 604. The table contains an entry/row for each of the non-neighbor nodes (requiring more than one hop to reach). Consistent with the topology shown in FIG. 3B, rows 611-616 represent information for each of nodes R3 363, R4 364, R5 365, R6 366, H4 384 and H3 383 respectively.

Parent index 604 is shown containing two values, separated by ':'. The first value indicates whether the entry for the parent can be found in neighbor table 500 (when 1) or distant topology table 600 (when 0). The second value is an index into the corresponding table. Thus, a value of 1:0 in row 611 for R3 indicates that the parent is present in neighbor table 500 and that the row 511 having an index of 0 represents the parent node. On the other hand, a value of 0:1 in row 614 for R6 indicates that the parent can be found in distant topology table 600 itself, at an index of 1. Thus, node R4 in row 612 (corresponding to index of 1) represents the parent of R6.

The information thus maintained can be used to formulate the source routing information for any packet. For example, assuming that a packet with destination IP address of 11:11:11:11:8:8:8:8 is received by BR 350, BR 350 examines index table 400 for a matching entry for prefix 11:11:11:11, and identifies entry with index value of 0 having a matching entry 411. BR 350 thereafter examines neighbor table 500 and distant topology table 600 for a node with prefix index value of 0 and host identifier of 8:8:8:8. Accordingly, row 615 (corresponding to H4 384, based on prefix index of 0 and host identifier 8:8:8:8) is found to have the corresponding entry.

Parent index 604 of the matching entry (0:0) is retrieved and the corresponding parent 611 (having array index of 0 in distant topology table 600) is identified. The parent is continued to be iteratively determined, until BR 350 itself is found to be the parent. Thus, the (reverse) path would be identified to be H4→R3→R1→BR. Accordingly, source routing information indicating a path of R1→R3→H4 is inserted into the header of the packet being processed and sent to R1. The packet is eventually delivered to H4 in a known way.

It may thus be appreciated that the network addresses of various nodes are represented by way of index, both to identify a node as well as the corresponding parent or next hop. Accordingly, the memory is substantially reduced.

In addition, if any node in the networked system 100 is dead or removed, then information corresponding to only one hop (i.e., either its parent or its children) has to be changed. For instance, in the example environment of networked system 100, if node R3 163 is removed, then only the parent index of H4 184 has to be changed. Assuming H4 184 chooses R1 161 as its new parent, the parent index 604 of H4 184 has to be changed to 1:0. Thus, updating of routing information in case of node removal is simplified.

In addition, the detection of any loops formed, upon insertion of a node is simplified. In an embodiment, the depth of the tree (maximum depth seen from BR) is maintained upon any topology changes (insertion or deletion of nodes, etc.). Upon insertion of a corresponding row in distant topology table 600 to add a corresponding node, parent index 604 of the distant topology table may be iteratively examined until an entry in neighbor table 500 is reached. The traversal indicates the distance (number of hops) of the inserted node from BR. If the distance at any point of traversal exceeds (1+depth of the tree), a loop is deemed to be formed, and corrective action (to remove the loop) may be taken. The traversal is simplified in view of the maintenance of parent index.

In an embodiment, prefix table 400, prefix index columns 503/602 are not used (and therefore not included in the maintained data), in case only a single prefix is known to be supported in the networked system 100. The description is continued with respect to 'multiple prefix' case.

6. Multiple Prefix

Figure 7A:
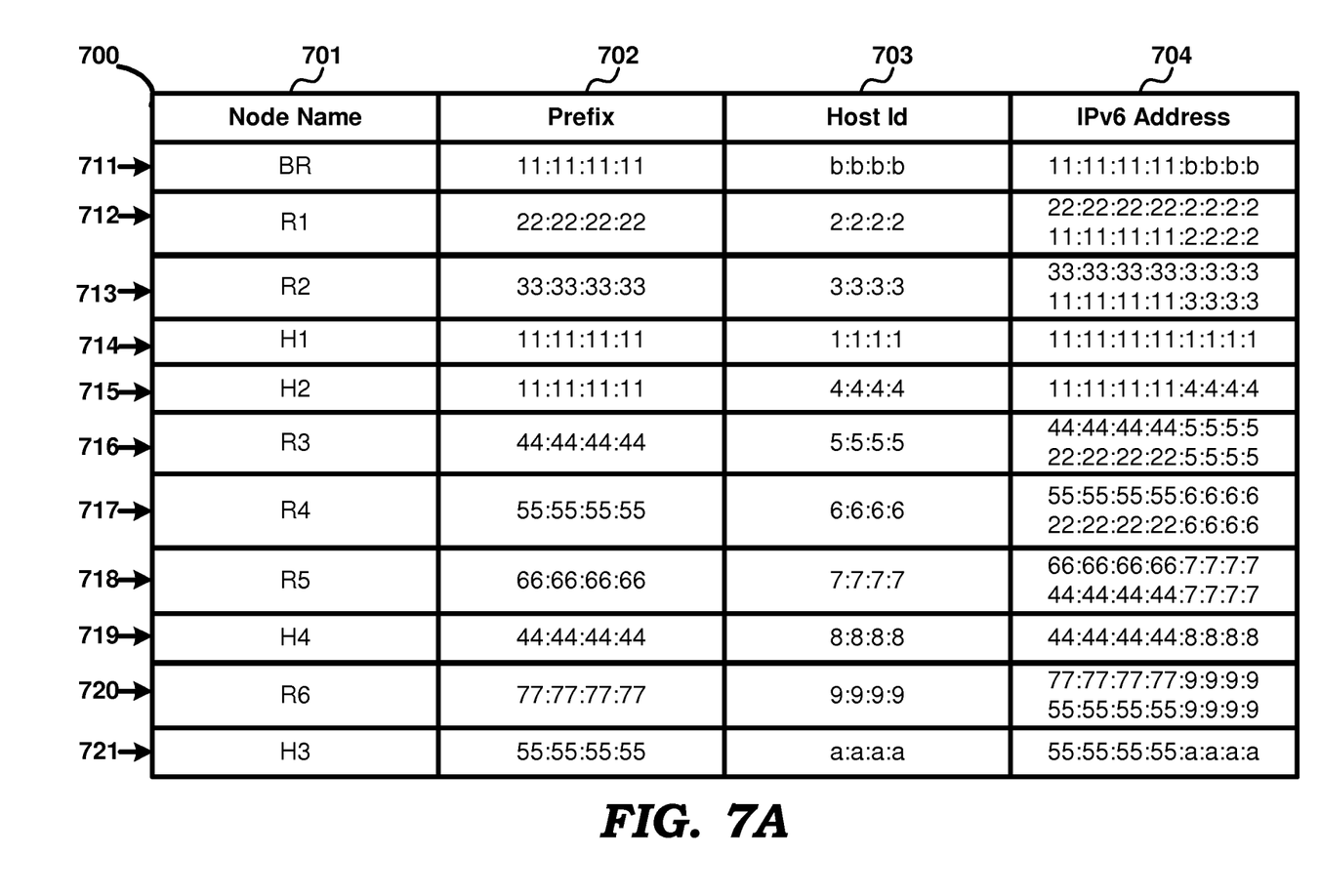
FIG. 7A depicts the respective address of nodes of a networked environment, with corresponding networked addresses of a multiple prefix case, in an embodiment.
Figure 7B:
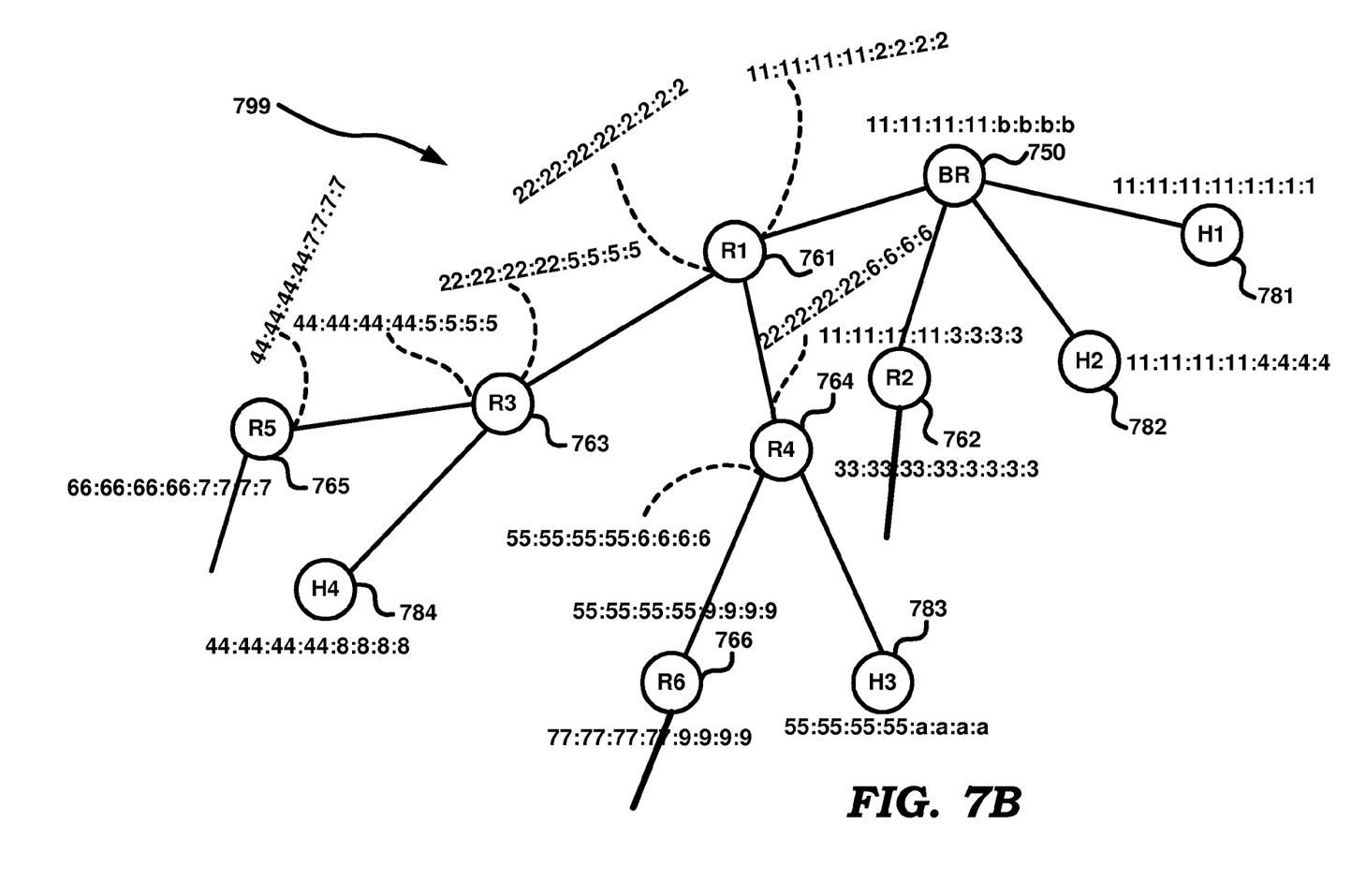
FIG. 7B depicts a topology representing the routing information pictorially, for multi prefix case, in an embodiment.

In a multiple prefix environment, nodes can potentially have multiple IP addresses, often with different prefixes, for a variety of reasons. FIG. 7A depicts a table indicating the IPv6 addresses of respective nodes. As may be observed, some of the nodes are shown with multiple addresses, with corresponding different prefixes. FIG. 7B depicts the topology (routing information) formed by operation of routing protocol. The respective addresses are shown with the topology, for the convenience of the reader.

In FIG. 7A respective entries are shown for each of nodes BR 750, hosts H1-H4 781-784, and routers R1-R6 761-766 shown in FIG. 7B. Table 700 is shown containing columns 701-704, which are explained respectively similar to columns 301-304 of FIG. 3. As may be observed, routers R1-R6 are all shown having two addresses each, with the prefix of the first address being different from the prefix of the second address.

Figure 8:
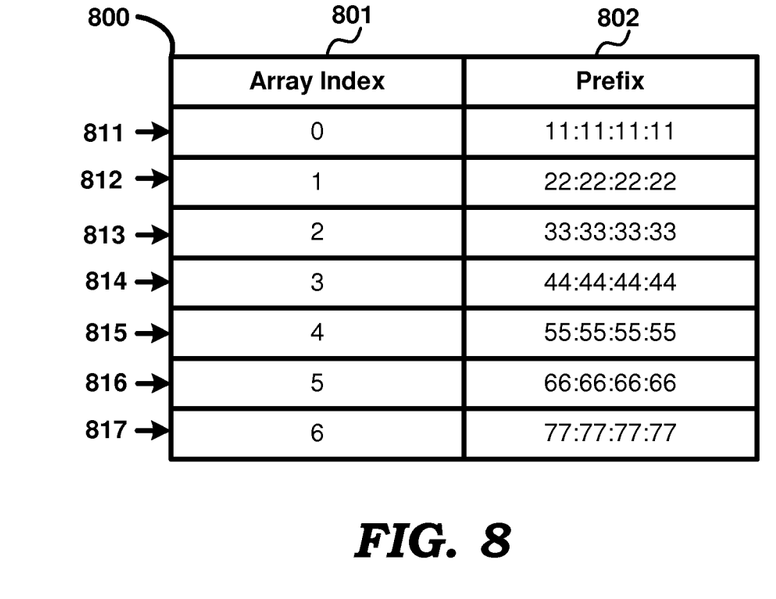
FIGS. 8-10 contain respective tables, together illustrating the manner in which routing information is represented in a memory, for multi prefix case, in one embodiment.
Figure 9:
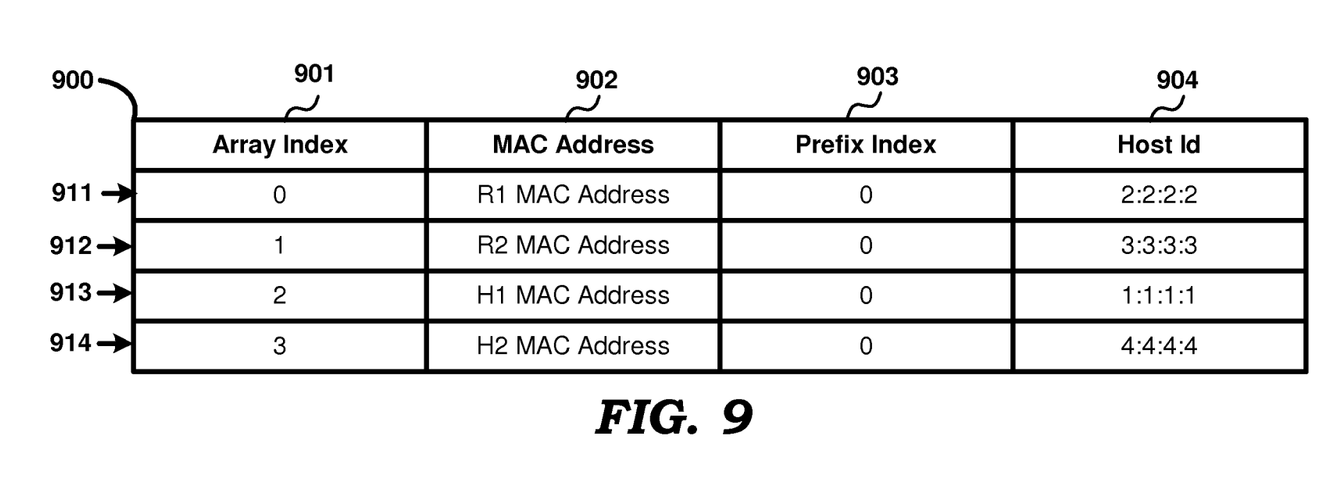
Figure 10:
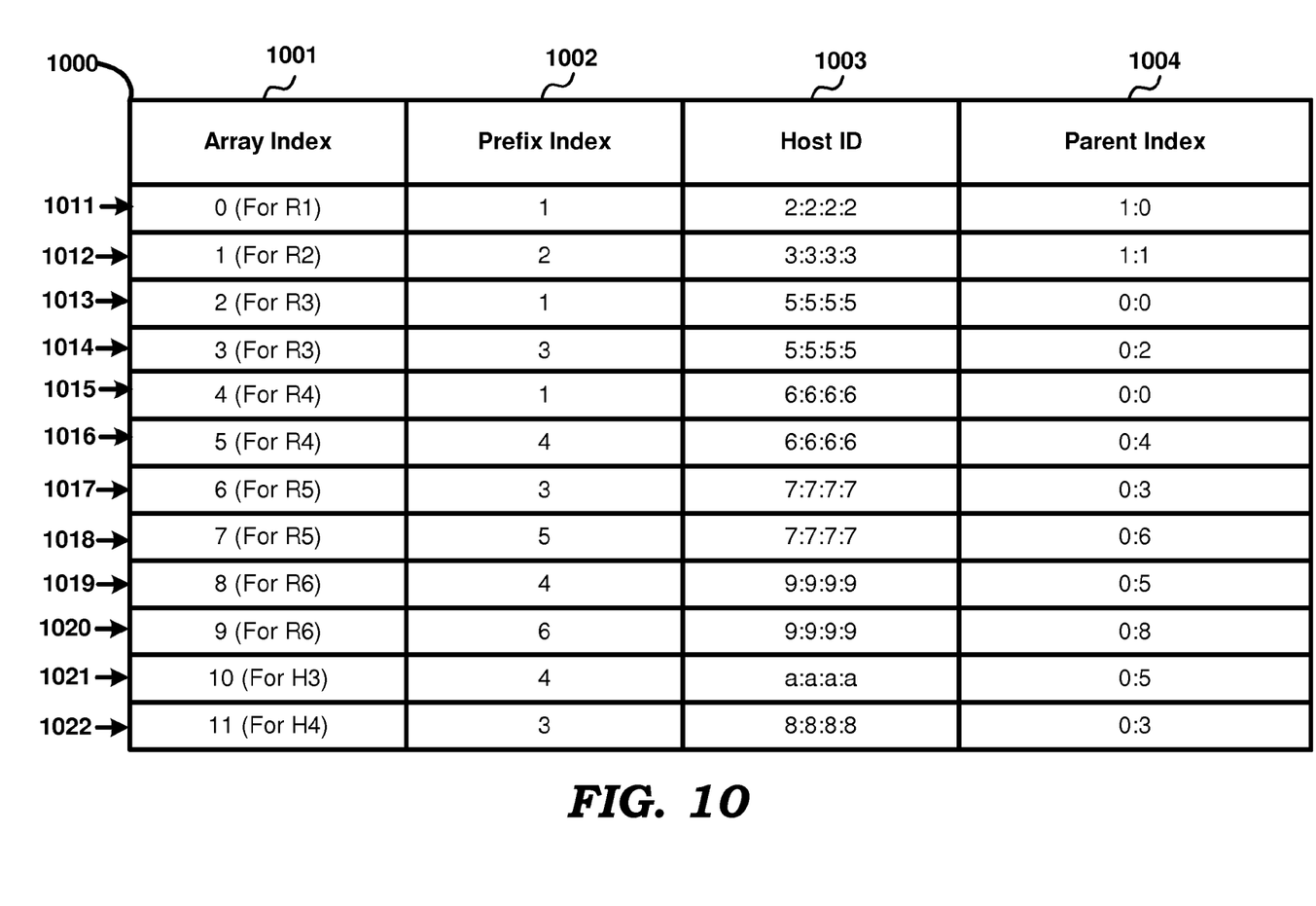

FIGS. 8-10 represent tables maintained by BR 750 to represent the routing information, in an embodiment. Each table of FIGS. 8-10 is shown with the same columns as the respective table in FIGS. 4-6, and are operative similar to the corresponding description provided above for FIGS. 4-6. However, the extensions/differences in view of the multiple addresses are noted below briefly.

Prefix table 800 is shown containing seven rows 811-817, with each row showing an index for the corresponding prefix. Neighbor table 900 is shown containing columns 901-904, which are explained similar to columns 501-504 of FIG. 5. Distant topology table 1000 is shown containing columns 1001-1004, which are explained similar to columns 601-604.

Each of routers R1 761-R6 766 are shown with total of two entries in neighbor table 900 and distant topology table 1000 together, consistent with having two network addresses. In particular, for routers R1 761 and R2 762, which are neighbors of BR 750, one entry is shown in neighbor table 900 and another entry is shown in distant topology table 1000. For the other routers R3-R6, two entries each are shown in distant topology table 1000.

Parent index 1004 again indicates the entry corresponding to the parent (as in column 604, described above). However, it may be observed that in case of a node having two network addresses, an order is imposed (one being treated as a parent of the other), and parent index 1004 is accordingly defined. For example, path H4 784 to BR 750 may be observed as being the below:

A. entry 1022 indicates that address 44:44:44:44:5:5:5:5 (one address of R3) in distant topology table 1000 is the parent of H4 784 with address 44:44:44:44:8:8:8:8;

B. entry 1014 indicates that address 22:22:22:22:5:5:5:5 (second address of R3) in distant topology table 1000 is the parent of R3 763 with address 44:44:44:44:5:5:5:5 (first address of R3);

C. entry 1013 indicates that address 22:22:22:22:2:2:2:2 (first address of R1) in distant topology table 1000 is the parent of R3 763 with address 22:22:22:22:5:5:5:5 (second address of R3);

D. entry 1011 indicates that address 11:11:11:11:2:2:2:2 (second address of R1) in neighbor table 900 is the parent of R1 761 with address 22:22:22:22:2:2:2:2 (first address of R1);

E. Since 11:11:11:11:2:2:2:2 is in neighbor table 900, BR 750 is inferred to be the parent.

Now assuming that BR 750 needs to route a packet with destination address of 44:44:44:44:8:8:8:8, BR 750 examines the routing information in accordance with the five steps A-E noted above, and determines the source routing information. The information is embedded in the packet header and sent to router R1 761 with address 11:11:11:11:2:2:2:2. The packet is forwarded by routers R1 761 and R3 763 to H4 784 eventually.

In an embodiment, the prefix table is sorted in ascending order to make it faster to find a prefix. Similarly the Neighbor table and the Routing table are sorted in ascending order of prefix index and in the same prefix index, the host ids are also sorted in ascending order (though the sorted order is not shown in FIGS. 8-10). This makes it easy and fast to search a node for routing packets.

It may be further appreciated that the width of host id, etc., shown in the tables is merely representative. For example, in networks that use fewer than 8 bytes for addressing the hosts, the number of bytes in host id column (of both neighbor table and distant topology table) can correspondingly be reduced. For example, in case of ZigBee-IP where 6ND is used for 16-bit (2 bytes) addressing, the Host ID field can be reduced to 2 bytes field saving more memory.

It may thus be observed that routing information is stored with reduced memory requirements, at the expense of additional processing, even in the case of multi prefix addresses. The description is continued with respect to the details of border (BR) in an embodiment.

8. Border Router

Figure 11:
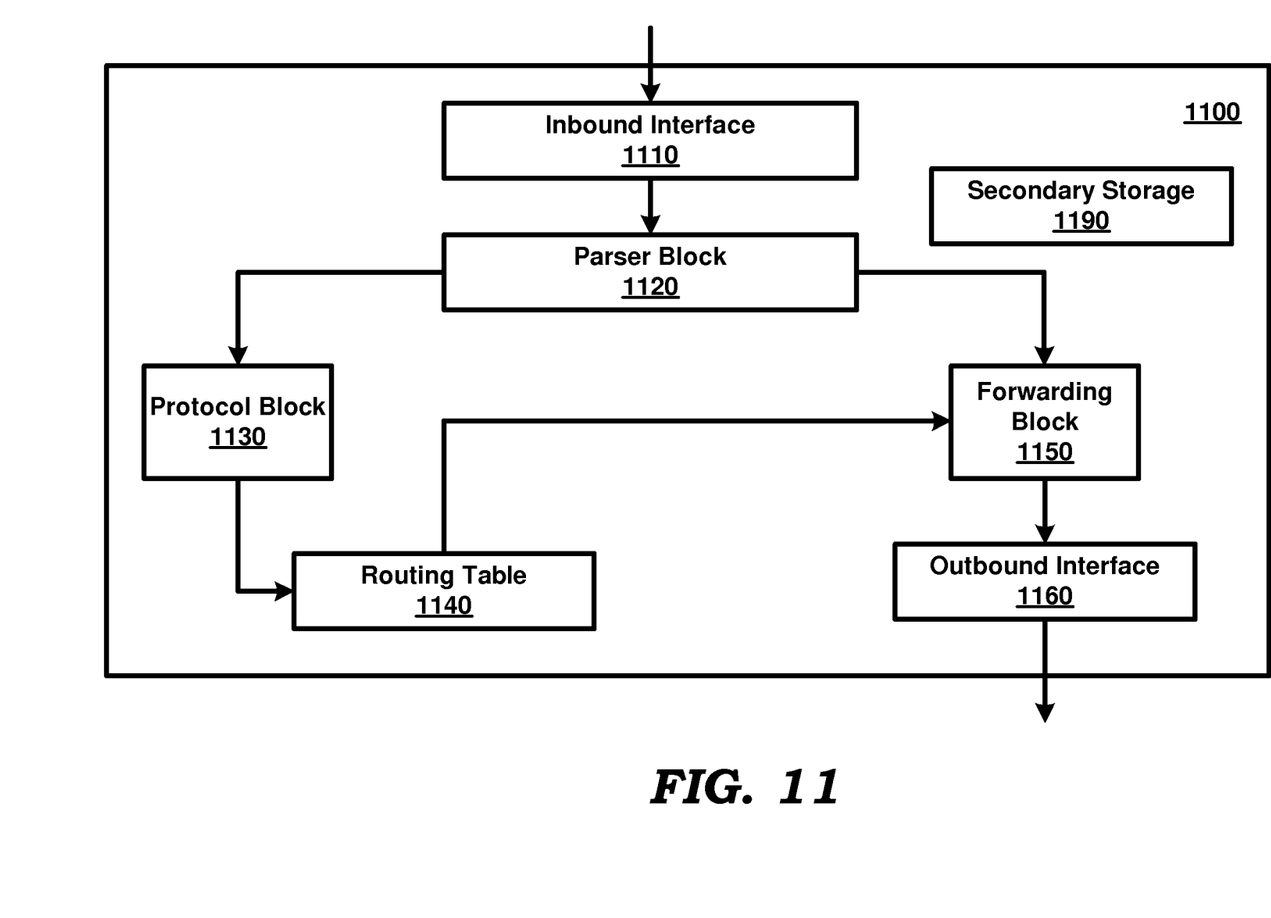
FIG. 11 is a block diagram illustrating the details of a router, in an embodiment.

FIG. 11 is a block diagram illustrating the details of Border router BR 150/350/750 (referred to hereafter with numeral 150 alone for convenience) in an embodiment. BR 150 is shown containing inbound interface 1110, parser block 1120, protocol block 1130, routing table 1140, forwarding block 1150, and outbound interface 1160. Each component is described in further detail below.

Inbound interface 1110 provides the electrical, physical, and protocol interfaces to receive data packets from various adjacent nodes. The received packets are forwarded to parser block 1120 in appropriate format (e.g., IP packets). Similarly, outbound interface 1160 provides the electrical, physical, and protocol interfaces to send/transmit data packets to adjacent nodes. Inbound interface 1110 and outbound interface 1160 may be integrated as a single transceiver for communication on wireless medium, and can be implemented in a known way.

Parser block 1120 examines each received packet and forwards the received packets to one of protocol block 1130 and forwarding block 1150. The specific component to forward to depends generally on the destination address and other header contents. Parser block 1120 may be implemented in a known way.

Routing tables 1140 represents a memory in which routing information is stored according to several aspects of the present disclosure. Thus, routing tables 1140 stores the tables shown in FIGS. 8-10 in the case of multi-prefix and FIGS. 4-6 in the case of single prefix.

Protocol block 1130 communicates with other routers/nodes according to a routing protocol to form routing information and store the same in accordance with various features described above. In an embodiment, the routing protocol corresponds to "Ripple" routing protocol (RPL), which builds a acyclic tree structure, as noted in the above examples. Due to the features of the present disclosure, the memory size required for representing routing table 1140 is reduced.

Forwarding block 1150 receives from parser block 1120, IP packets to be forwarded to respective destination hosts, and determines the path to be taken by each packet in reaching the corresponding destination, as described above. In particular, the various tables maintained with the prefix substituted by the corresponding index, are examined to determine the path, as explained above in the two cases. The source routing information determined as a result is embedded into the packet and forwarded to the next (or first) hop node in the path using outbound interface 1160.

Though shown as respective separate blocks, the operation of blocks 1110, 1120, 1130, 1150 and 1160 may be obtained by execution of executable modules by one or more processors (not shown) contained in the BR. The executable modules may be stored on secondary storage memory 1190 (representing a non-transitory machine/computer readable storage/medium). Secondary Storage memory 1190 may be in the form of removable storage or embedded into NVRAM type memories embedded into BR.

The corresponding storage media is distinct from but may be used in conjunction with transmission media. Transmission media participates in transferring information between storage media. For example, transmission media includes coaxial cables, copper wire and fiber optics, including the wires that form buses. Transmission media can also take the form of acoustic or light waves, such as those generated during radio-wave and infra-red data communications.

9. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method performed in a router, said method comprising:
   forming routing information in relation to a networked system in which said router is operative, said routing information containing network addresses of at least some of the routers and hosts which are also part of said networked system, wherein said networked system operates according to a network protocol in which each network address comprises a prefix and a host identifier;
   associating a corresponding digital code of a set of digital codes to a respective portion of a network address of said network addresses; and
   storing, in a memory, said routing information with each of said set of digital codes substituted for the respective portion of the network address, wherein said respective portion corresponds to each value for said prefix in network addresses of said routing information,
   wherein said associating and said storing together comprise:
      maintaining a prefix table and topology information as said routing information, wherein said topology information comprises a neighbor table and a distant topology table,
      wherein said neighbor table indicates nodes which are neighbors to said router,
      wherein said distant topology table contains a first plurality of entries, with each entry corresponding to a respective node of a plurality of nodes which are non-neighbors to said router, each entry further indicating a parent of the node represented by the entry, wherein each node of said neighbor table and said distant topology table is identified by the corresponding network address, with the digital code replacing the corresponding value for the prefix in the network address, each node being one of said hosts and said routers,
   wherein said prefix table stores a mapping of each digital code to a corresponding value for said prefix in network addresses of said routing information,
   wherein said topology information indicates a manner in which each host system and router of said networked system are connected to each other, wherein each host system and router are identified by a corresponding network address, with the digital code replacing the corresponding value for the prefix in the network address.

2. The method of claim 1, further comprising:
   receiving a packet to be forwarded to a destination host;
   identifying a path by examining said routing information in said memory, with said set of digital codes substituted for the respective portions of the network addresses; and
   forwarding said packet on said path.

3. The method of claim 1, wherein each of first plurality of entries of said distant topology table contains a first field and a second field,
   said first field indicating whether the corresponding parent is in said neighbor table or said distant topology table,
   said second field containing an index pointing to the specific entry of the neighbor table or said distant topology table as indicated by said first field.

4. The method of claim 3, wherein said nodes of said networked system operate based on a plurality of network identifiers such that said prefix table contains a plurality or entries, with each entry storing the corresponding digital code for a respective network identifier of said plurality of network identifiers,
   wherein said networked system operates in accordance with IPv6 networking protocols.

5. The method of claim 4, further comprising:
   maintaining depth of a tree representing the manner in which said routers and said hosts of said networked system are connected, wherein said router represents a root of said tree;
   inserting a new entry into said distant topology table upon addition of a new router;
   examining said first field and said second field of said first plurality of entries to identify a number of hops of said new router from said root; and
   determining that a loop is formed in said tree if said number of hops is more than (1+said depth of said tree prior to said inserting).

6. A non-transitory machine readable medium storing one or more sequences of instructions for causing a router to route packets in a networked system, wherein execution of said one or more sequences of instructions by one or more processors contained in said router causes said router to perform the actions of:
   forming routing information in relation to said networked system in which said router is operative, said routing information containing network addresses of at least some of the routers and hosts which are also part of said networked system, wherein said networked system operates according to a network protocol in which each network address comprises a prefix and a host identifier;
   associating a corresponding digital code of a set of digital codes to a respective portion of a network address of said network addresses; and storing, in a memory, said routing information with each of said set of digital codes substituted for the respective portion of the network address, wherein said respective portion corresponds to each value for said prefix in network addresses of said routing information, wherein said associating and said storing together comprise:

maintaining a prefix table and topology information as said routing information, wherein said topology information comprises a neighbor table and a distant topology table, wherein said neighbor table indicates nodes which are neighbors to said router, wherein said distant topology table contains a first plurality of entries, with each entry corresponding to a respective node of a plurality of nodes which are non-neighbors to said router, each entry further indicating a parent of the node represented by the entry, wherein each node of said neighbor table and said distant topology table is identified by the corresponding network address, with the digital code replacing the corresponding value for the prefix in the network address, each node being one of said hosts and said routers, wherein said prefix table stores a mapping of each digital code to a corresponding value for said prefix in network addresses of said routing information, wherein said topology information indicates a manner in which each host system and router of said networked system are connected to each other, wherein each host system and router are identified by a corresponding network address, with the digital code replacing the corresponding value for the prefix in the network address.

7. The non-transitory machine readable medium of claim 6, wherein said actions further comprise:

receiving a packet to be forwarded to a destination host;

identifying a path by examining said routing information in said memory, with said set of digital codes substituted for the respective portions of the network addresses; and forwarding said packet on said path.

8. The non-transitory machine readable medium of claim 6, wherein each of first plurality of entries of said distant topology table contains a first field and a second field, said first field indicating whether the corresponding parent is in said neighbor table or said distant topology table, said second field containing an index pointing to the specific entry of the neighbor table or said distant topology table as indicated by said first field.

9. A router for operation in a networked system, said router comprising:

a memory to store instructions;

a processing unit to retrieve and execute said instructions to cause said router perform the actions of:

forming routing information in relation to said networked system in which said router is operative, said routing information containing network addresses of at least some of the routers and hosts which are also part of said networked system, wherein said networked system operates according to a network protocol in which each network address comprises a prefix and a host identifier;

associating a corresponding digital code of a set of digital codes to a respective portion of a network address of said network addresses; and storing, in a memory, said routing information with each of said set of digital codes substituted for the respective portion of the network address, wherein said respective portion corresponds to each value for said prefix in network addresses of said routing information, wherein said associating and said storing together comprise:

maintaining a prefix table and topology information as said routing information, wherein said topology information comprises a neighbor table and a distant topology table, wherein said neighbor table indicates nodes which are neighbors to said router, wherein said distant topology table contains a first plurality of entries, with each entry corresponding to a respective node of a plurality of nodes which are non-neighbors to said router, each entry further indicating a parent of the node represented by the entry, wherein each node of said neighbor table and said distant topology table is identified by the corresponding network address, with the digital code replacing the corresponding value for the prefix in the network address, each node being one of said hosts and said routers, wherein said prefix table stores a mapping of each digital code to a corresponding value for said prefix in network addresses of said routing information, wherein said topology information indicates a manner in which each host system and router of said networked system are connected to each other, wherein each host system and router are identified by a corresponding network address, with the digital code replacing the corresponding value for the prefix in the network address.

10. The router of claim 9, wherein said actions further comprise:

receiving a packet to be forwarded to a destination host;

identifying a path by examining said routing information in said memory, with said set of digital codes substituted for the respective portions of the network addresses; and forwarding said packet on said path.

11. The router of claim 9, wherein each of first plurality of entries of said distant topology table contains a first field and a second field, said first field indicating whether the corresponding parent is in said neighbor table or said distant topology table, said second field containing an index pointing to the specific entry of the neighbor table or said distant topology table as indicated by said first field.

* * * * *